United States Patent
Shen et al.

(10) Patent No.: US 10,498,874 B2
(45) Date of Patent: Dec. 3, 2019

(54) DISPLAY APPARATUS HAVING ABILITY OF VOICE CONTROL AND METHOD OF INSTRUCTING VOICE CONTROL TIMING

(71) Applicant: CAL-COMP BIG DATA, INC., New Taipei (TW)

(72) Inventors: Shyh-Yong Shen, New Taipei (TW); Min-Chang Chi, New Taipei (TW); Ching-Sheng Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 15/786,566

(22) Filed: Oct. 17, 2017

(65) Prior Publication Data

US 2018/0367654 A1    Dec. 20, 2018

(30) Foreign Application Priority Data

Jun. 19, 2017 (CN) .......................... 2017 1 0464202

(51) Int. Cl.
| | |
|---|---|
| *H04M 3/00* | (2006.01) |
| *H04M 1/27* | (2006.01) |
| *G06F 21/32* | (2013.01) |
| *G06F 1/3228* | (2019.01) |
| *H04W 52/02* | (2009.01) |
| *H04M 1/725* | (2006.01) |
| *G06F 1/3234* | (2019.01) |

(52) U.S. Cl.
CPC .......... *H04M 1/271* (2013.01); *G06F 1/3228* (2013.01); *G06F 1/3265* (2013.01); *G06F 21/32* (2013.01); *H04M 1/725* (2013.01); *H04W 52/027* (2013.01); *G09G 2330/022* (2013.01)

(58) Field of Classification Search
CPC .............................. H04M 1/271; G06F 1/3228
USPC ...... 379/265.01–265.14, 266.01–266.1, 309, 379/252, 253, 255, 201.01, 251
See application file for complete search history.

(56) References Cited

U.S. PATENT DOCUMENTS 7,747,445 B2 *   6/2010 Agapi .................... G10L 15/22
                                                                 704/275
2014/0297287 A1 * 10/2014 Newman ................. G10L 15/08
                                                                 704/275

(Continued)

FOREIGN PATENT DOCUMENTS

EP        2884385 A1      6/2015

OTHER PUBLICATIONS

Search Report dated May 14, 2018 of the corresponding European patent application.

*Primary Examiner* — William J Deane, Jr.
(74) *Attorney, Agent, or Firm* — Chun-Ming Shih; HDLS IPR Services

(57) ABSTRACT

A display apparatus having ability of voice control and method of instructing voice control timing, the method includes following steps of: displaying a view of voice control instruction message; receiving a voice and generating initial voice data; receiving another voice and generating control voice data when determining that the initial voice data is matched with trigger voice data; executing a corresponded control command when the generated control voice data is matched with default voice data; and, stopping displaying the view of voice control instruction message. The user experience can thus be enhanced via instructing the user the timing of inputting voice control.

14 Claims, 8 Drawing Sheets

(56) References Cited

U.S. PATENT DOCUMENTS

2015/0141079 A1  5/2015  Wang et al.
2017/0110111 A1* 4/2017  Matsubara ............ G10L 13/027

* cited by examiner

DISPLAY APPARATUS HAVING ABILITY OF VOICE CONTROL AND METHOD OF INSTRUCTING VOICE CONTROL TIMING

BACKGROUND OF THE INVENTION

Field of the Invention

The technical field relates to device and method, and more particularly related to display apparatus having ability of voice control and method of instructing voice control timing.

Description of Related Art

The voice control device (such as navigators, smart phones or smart home appliances) of the related art is not always available to receive a voice control operation from user. For example, the navigator is not available to route a path and receive a voice control operation at the same time. The smart phone is available to receive a voice control operation only if an application supporting voice control was executed. The smart appliances are available to receive a voice control operation only if it is under a voice control mode.

The user must to try the different voice control timings for grasping each voice control timing of each voice control device caused by the voice control timings of the different voice control devices being different each other, such that the user had poor user experience. Moreover, the available voice commands of each voice device are not the same exactly. As a result, the user must to remember those available voice commands of each voice device additionally, such that the user felt inconvenient.

The present disclosed example is directed to a display apparatus having ability of voice control and a method of instructing voice control timing being used for instructing the user the voice control timing.

SUMMARY OF THE INVENTION

One of the exemplary embodiments, a method of instructing voice control timing applied to a display apparatus having ability of voice control, comprises following steps of: a) controlling the display apparatus having ability of voice control to display a view of a voice control instruction message, wherein the voice control instruction message is used for instructing content of trigger voice data; b) receiving first voice for generating first voice data; c) receiving second voice for generating second voice data if determining that the first voice data is matched with the trigger voice data; d) executing a control command corresponding to default voice data if determining that the second voice data is matched with the default voice data; and e) stop displaying the view of the voice control instruction message.

Preferably, the step a) is configured to display the view of the voice control instruction message after the display apparatus having ability of voice control switched to a status of enabling voice control, the display apparatus having ability of voice control is configured to allow voice control in the status of enabling voice control; the step e) is configured to stop displaying the view of the voice control instruction message after the display apparatus having ability of voice control switched to a status of disabling voice control, the display apparatus having ability of voice control is configured to refuse voice control in the status of disabling voice control.

Preferably, the method of instructing voice control timing comprises following steps before step a): f1) selecting one of a plurality of language information; f2) selecting one of a plurality of candidate trigger voice data according to the selected language information, and configuring the selected candidate trigger voice data as the trigger voice data; and f3) selecting one of a plurality of candidate voice control instruction messages according to the selected language information, and configuring the selected candidate voice control instruction message as the voice control instruction message.

Preferably, the voice control instruction message comprises a trigger text message for instructing the trigger voice data.

Preferably, the step c) comprises: c1) displaying a view of a listening instruction message if determining that the first voice data is matched with the trigger voice data; and, c2) receiving the second voice data for generating the second voice data.

Preferably, the step c) further comprises: c3) starting to count a listening time after displaying the view of the listening instruction message; and, c4) stopping displaying the view of the listening instruction message after the listening time elapsed.

Preferably, the step c) further comprises a step c5) displaying a view of a voice-received instruction message after the second voice data was received.

Preferably, the method of instructing voice control timing further comprises following steps after the step d): g1) receiving third voice for generating third voice data during counting the listening time; and, g2) executing the control command corresponding to the matched default voice data if the third voice data is matched with one of the plurality of the default voice data.

Preferably, the step d) comprises following steps of: d1) executing the control command corresponding to the matched default voice data if determining that the second voice data is matched with one of the plurality of the default voice data; and, d2) display a view of an execution instruction message corresponding to the control command.

One of the exemplary embodiments, a display apparatus having ability of voice control, comprises: a voice-inputting module; a display module; a memory module for storing trigger voice data, a plurality of default voice data and a plurality of control commands respectively corresponding to the plurality of the default voice data; and, a control module electrically connected to the voice-inputting module, the display module and the memory module; wherein the control module controls the display module to: display a view of a voice control instruction message, the voice control instruction message is used for instructing content of the trigger voice data; and, stop displaying the view of the voice control instruction message; wherein the voice-inputting module is configured to allow a user to: input first voice for generating first voice data after the display module displayed the view of the voice control instruction message; and, input second voice for generating second voice data if the control module determined that the first voice data is matched with the trigger voice data and making the control module execute the corresponded control command if determining that the second voice data is matched with one of the plurality of the default voice data.

Preferably, the control module controls the display apparatus to display the view of the voice control instruction message after the display apparatus having ability of voice control switched to a status of enabling voice control, and the control module controls the display apparatus to stop displaying the view of the voice control instruction message after the display apparatus having ability of voice control switched to a status of disabling voice control, the display apparatus having ability of voice control is configured to allow voice control in the status of enabling voice control and refuse voice control in the status of disabling voice control.

Preferably, the memory module further stores a plurality of candidate trigger voice data and a plurality of candidate voice control instruction messages; the display apparatus having ability of voice control further comprises a keypad module electrically connected to the control module, the keypad module receives a language-selecting operation for selecting one of a plurality of the language information, the control module selects one of the plurality of the candidate trigger voice data according to the selected language information, makes the selected candidate trigger voice data as the trigger voice data, selects one of the plurality of the candidate voice control instruction messages according to the selected language information, and makes the selected candidate voice control instruction message as the voice control instruction message.

Preferably, the voice control instruction message comprises a trigger text message used to instruct the trigger voice data.

Preferably, the display module displays a view of a listening instruction message if the first voice data is matched with the trigger voice data.

Preferably, the control module comprises a control module; the control module starts to count a listening time after the display module displayed the view of the listening instruction message, and the display module stops displaying the view of the listening instruction message after the listening time elapsed.

Preferably, the display module displays a view of a voice-received instruction message after the voice-inputting module received the second voice data.

Preferably, the voice-inputting module receives third voice data for generating third voice data during counting the listening, and the control module executes the corresponded control command if determining that the third voice data is matched with one of the plurality of the default voice data.

Preferably, the display module displays a view of an execution instruction message corresponding to the control command executed by the control modules The present disclosed example can effectively enhance user experience via instructing the user that the timing of inputting voice control.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
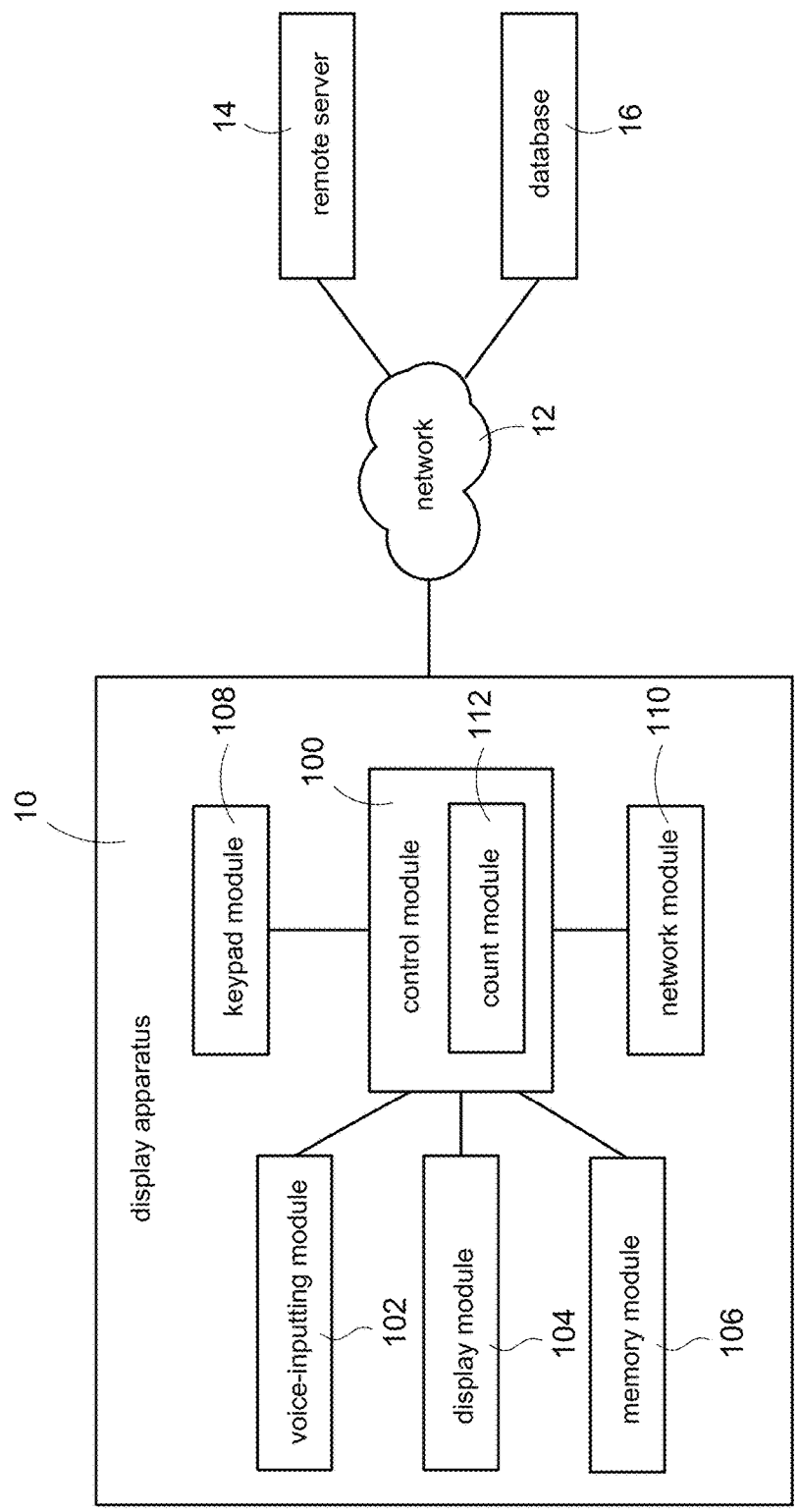
FIG. 1 is an architecture diagram of a display apparatus having ability of voice control according to the first embodiment of the present disclosed example.

First, please refer to FIG. 1 which is an architecture diagram of a display apparatus having ability of voice control according to the first embodiment of the present disclosed example. As shown in figure, the present disclosed example disclosed a display apparatus 10 having ability of voice control (referred to as display apparatus 10 in following description), the display apparatus 10 may actively instruct the user whether a voice control function is enabled or disabled.

The display apparatus 10 mainly comprises a control module 100, a voice-inputting module 102, a display module 104 and a memory module 106.

The voice-inputting module 102, such as microphone, is used to receive voice of the user and transform the received voice into the corresponded voice data. The display module 104, such as LCD or touch screen, is used to display the correspond information according to control of the control module 100.

The memory module 106 is used to store data. One of the exemplary embodiments, the memory module 106 stores at least one of default voice data, and stores at least one of control command respectively corresponding to above-mentioned default voice data.

The control module 100, such as micro-controllers (MCUs) or central processing unit (CPU), is electrically connected to the voice-inputting module 102, the display module 104 and memory module 106, and has ability of controlling above-mentioned modules. More specifically, the control module 100 may control the display apparatus 10 to switch between the status of enabling voice control and the status of disabling voice control. When the display apparatus 10 is switched to the status of enabling voice control, the control module 100 may retrieve the voice data corresponding to the inputted voice via the voice-inputting module 102, may search the control command corresponding to the retrieved voice data in memory module 106 according to the retrieved voice data, and may execute the retrieved control command. Thus, the display apparatus 10 has ability of implementing the voice control function.

One of the exemplary embodiments, the display apparatus 10 may implement a function of inputting by pressing key. More specifically, the display apparatus 10 further comprises a keypad module 108, such as entity keys and/or touch button, electrically connected to the control module 100. The keypad module 108 is used to receive an input operation form the user, and generates input keypad data corresponding to the input operation.

One of the exemplary embodiments, the display apparatus 10 may further implement a networking function. More specifically, the display apparatus 10 further comprises a network module 110, such as Ethernet network module, Wi-Fi module and/or cellular network module, electrically connected to the control module 100. The network module 110 is used to connect to network 12, such as the internet, and has ability of connecting to a remote server 14 or a database 16 via the network 12 for receiving or transferring data.

Figure 2A:
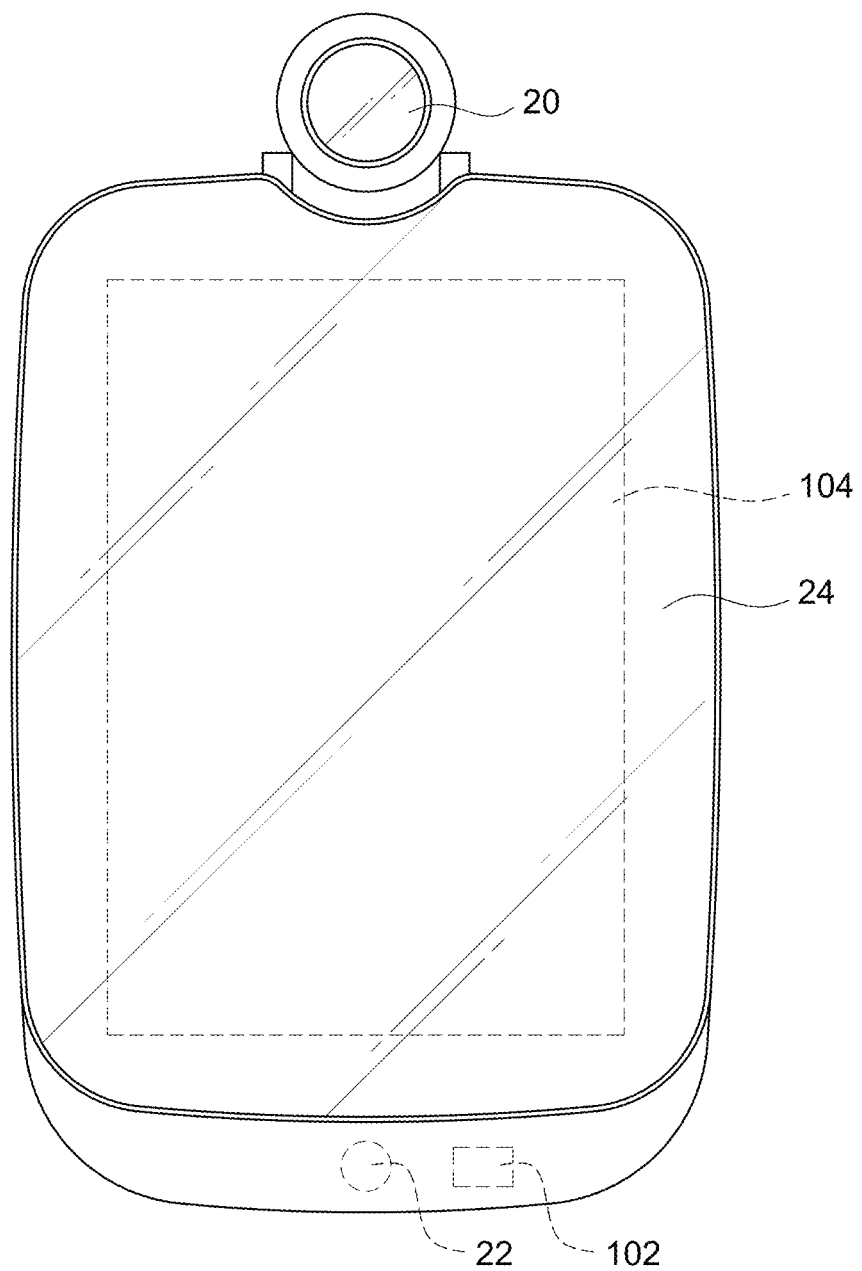
FIG. 2A is a front schematic view of a display apparatus having ability of voice control according to the second embodiment of the present disclosed example.
Figure 2B:
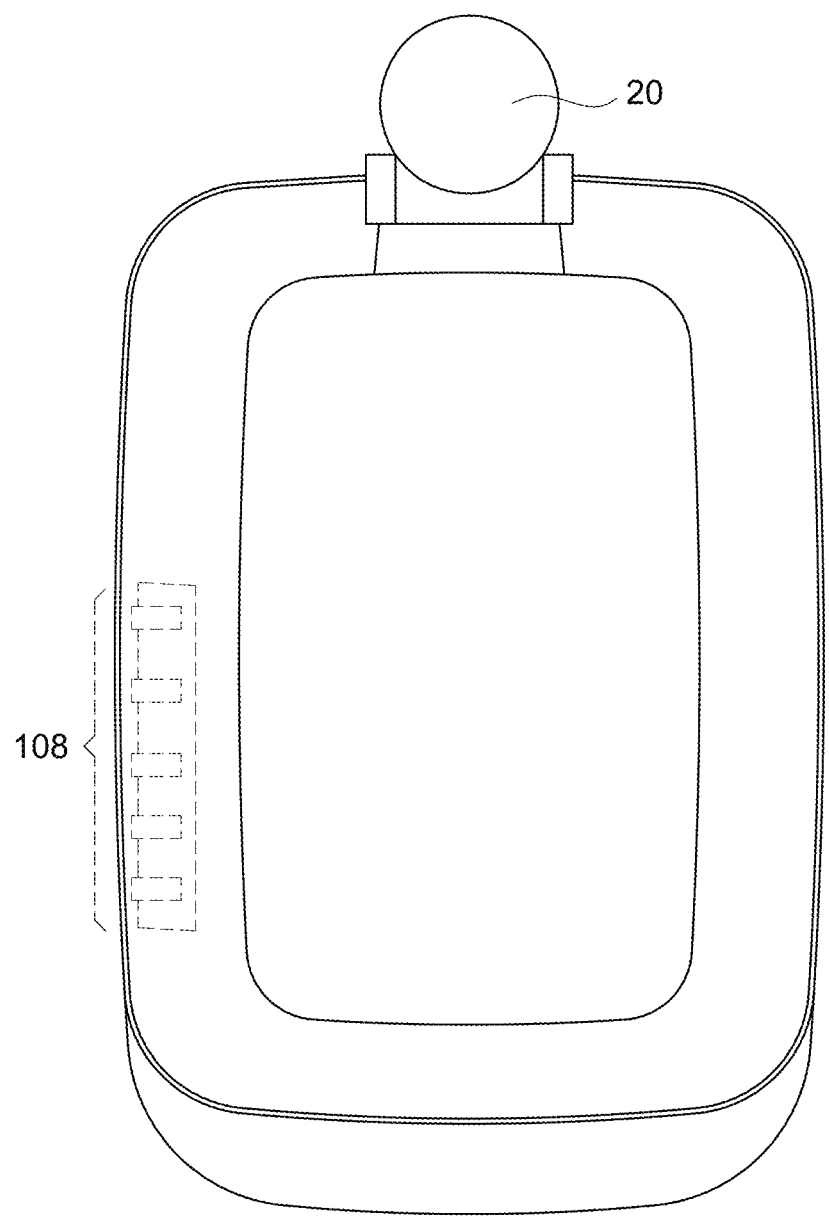
FIG. 2B is a back schematic view of a display apparatus having ability of voice control according to the second embodiment of the present disclosed example.

Please refer to FIG. 1, FIG. 2A, and FIG. 2B, simultaneously, FIG. 2A is a front schematic view of a display apparatus having ability of voice control according to the second embodiment of the present disclosed example, FIG. 2B is a back schematic view of a display apparatus having ability of voice control according to the second embodiment of the present disclosed example.

In this embodiment, the display apparatus 10 an electronic mirror and comprises an image capture device 20 (such as camera) and a movement sensor 22 (such as PIR sensor). Both the image capture device 20 and the movement sensor 22 are electrically connected to the control module 100.

The image capture device 20 is arranged above the display apparatus 10 for shooting the user. The movement sensor 22 sends a trigger signal to the control module 100 after detecting that the user approached, the control module 100 awakens the display module 104 (such as booting or turning on backlight) after receiving the trigger signal. Thus, the user can operate the display apparatus 10 directly without any awake operation after approached the display apparatus 10.

Beyond this, the keypad module 108 of this embodiment is arranged on the back edge of the display apparatus 10, such as the position of the keypad module 108 shown in FIG. 2B. Through the above-mentioned arrangement, the front of facade of the display apparatus 10 of the present disclosed example is concise, so as to make the user feel comfortable. Besides, the present disclosed example can enhance user experience via providing keypad operation function simultaneously.

In addition, the display apparatus 10 of this embodiment further comprises unidirectional glass 24. Above-mentioned unidirectional glass 24 is used to cover a display surface of the display module 104. When the display module 104 shuts down (such as power off or turning off its backlight), the use can see the user's mirror image in the unidirectional glass 24 caused by light intensity of the front side (the side which the user is located at) of the unidirectional glass 24 being stronger than light intensity of the back side (the side which the display module 104 is located at) of the unidirectional glass 24. In this status, the display apparatus 10 is used as a general mirror. When the display module 104 boots (such as power on or turning on its backlight), the use can see a displayed content of the display module 104 in the unidirectional glass 24 caused by light intensity of the front side (the side which the user is located at) of the unidirectional glass 24 being weaker than light intensity of the back side (the side which the display module 104 is located at) of the unidirectional glass 24. In this status, the display apparatus 10 is used as a display.

The present disclosed example can configure the display apparatus 10 to be a display for implementing a display function or a mirror for implementing a mirror function.

Figure 3:
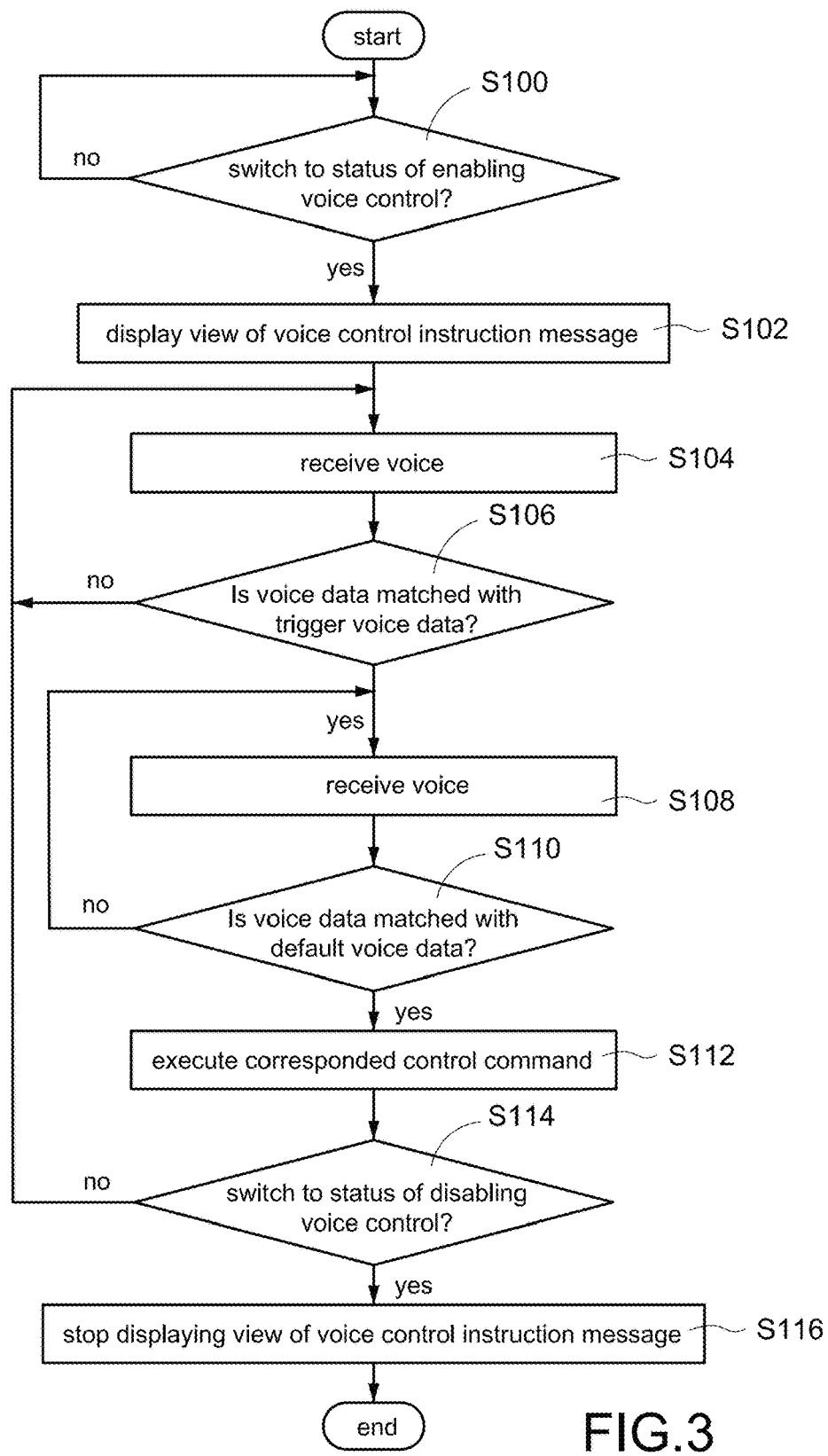
FIG. 3 is a flowchart of a method of instructing voice control timing according to the first embodiment of the present disclosed example.

Please refer to FIG. 3, which is a flowchart of a method of instructing voice control timing according to the first embodiment of the present disclosed example. The method of instructing voice control timing of each embodiment of the present disclosed example can be implemented by anyone of the display apparatuses 10 shown in FIG. 1 to FIG. 2B.

In the embodiment shown in FIG. 3, the memory module 106 of the display apparatus 10 comprises a non-transient computer readable recording media; the non-transient computer readable recording media stores computer software, such as application or operation system. Above-mentioned computer software records computer executable codes, the control module 100 may control the display apparatus 100 to perform each step shown in FIG. 3 when the control module 100 executes the computer software.

Step S100: the control module 100 determines whether the display apparatus 10 had switched to the status of enabling voice control.

More specifically, the display apparatus 10 may switch between the status of enabling voice control and the status of disabling voice control. When the display apparatus 10 is under the status of enabling voice control, the display apparatus 10 has ability of receiving voice control from user via the voice-inputting module 102. When the display apparatus 10 is under the status of disabling voice control, the display apparatus 10 stops receiving voice control from the user via the voice-inputting module 102.

For example, the display apparatus 10 may switch to the status of disabling voice control automatically during playing video, execution of process (such as analyzing the images captures by the image capture device 20 or connecting to the remote server 14), or execution of the application which doesn't support voice control. Additionally, the display apparatus 10 may switch to the status of enabling voice control automatically during completion of playing video, completion of execution of process, or execution of the application supporting voice control.

If the control module 100 determines that the display apparatus 10 had switched to the status of enabling voice control, the control module 100 performs the step S102. Otherwise, the control module 100 performs the step S100 again for determining continuously.

Step S102: the control module 100 loads a voice control instruction message (the message of the present disclosed example may be text message, graphic message or combination of both) pre-stored in the memory module 106, transforms the loaded voice control instruction message into a visible view, and controls the display module 104 to display the view of the voice control instruction message for instructing the user that the user may input a voice control operation currently (namely, the display module 10 is under the status of enabling voice control now).

In the other embodiment, the message of the present disclosed example may be an indicator light message, a voice message, or the other non-graphic non-text message.

When the message is the indicator light message, the display apparatus 10 may comprise one or more indicator light (not shown in figures) electrically connected to the control module 100. The control module 100 may load the pre-stored message from the memory module 106, and may control the indicator light to output the loaded indicator light message, such as controlling one or more indicator light to light on or off according to the default frequency or order. When the message is voice message, the display apparatus 10 may comprises a voice-outputting device (not shown in Fig., such as speaker or buzzer) electrically connected to the control module 100. The control module 100 may load the pre-stored message from the memory module 106, and may control the voice-outputting device to play the loaded voice message.

One of the exemplary embodiments, above-mentioned voice control instruction message comprises a trigger text message; the trigger text message corresponds to a default trigger text or a default trigger sentence. Namely, the control module 100 first transforms above-mentioned trigger text or trigger sentence into the view with graphic form, then controls the display module 104 to display the view.

Step S104: the control module 100 receives voice via voice-inputting module 102. More specifically, the user may input the voice (such as first voice) via voice-inputting module 102 after watching the view of the voice control instruction message displayed by the display module 104. Then, the control module 100 control the voice-inputting module 102 to generate the corresponded voice data (such as first voice data) according to the first voice.

One of the exemplary embodiments, the user may directly read the displayed trigger text or the displayed trigger sentence out to complete the input of first voice if above-mentioned voice control instruction message comprises the trigger text message corresponding to the default trigger text or the default trigger sentence. Namely, the content of the first voice is the same or similar as the content of the trigger text or the trigger sentence. Thus, the user can easily trigger the voice control without remembering the trigger text or the trigger statement additionally.

Step S106: the control module 100 determines whether the first voice data is matched with the trigger voice data stored in the memory module 106 in advance.

More specifically, above-mentioned trigger voice data corresponds to the default trigger text or the default trigger sentence.

If the control module 100 determines that the first voice data is matched with the trigger voice data, the control module 100 may control the display module 104 to display the view of the trigger voice correctness message stored in the memory module 106 in advance. Then, the control module 100 performs step S108.

If the control module 100 determines that the first voice data is not matched with the trigger voice data, the control module 100 may control the display module 104 to display the view of the trigger voice incorrectness message stored in the memory module 106 in advance. Then, the control module 100 performs the step S104 again.

Step S108: the control module 100 receives voice via voice-inputting module 102 again.

More specifically, the user may input another voice (such as the second voice) via voice-inputting module 102 after the user watched the view of the trigger voice correctness message display on the display module 104. Then, the control module 100 controls the voice-inputting module 102 to generate the voice data (such as the second voice data) corresponding to the inputted second voice.

Step S110: the control module 100 determines whether the second voice data is matched with any default voice data.

More specifically, the memory module 106 may store one or more default voice data in advance, each default voice data respectively corresponds to the different text or sentence of voice control command. Furthermore, the memory module 106 may store one or more command(s), and each command respectively corresponds to the different default voice data.

Besides, the user reads one of the above-mentioned text and sentence of voice control command out for completing input of the second voice via the voice-inputting module 102 in the step S108.

If the control module 100 determines that the second voice data is matched with any default voice data, the control module 100 may control the display module 104 to display a view of the voice control correctness message stored in the memory module 106 in advance. Then, the control module 100 performs step S112.

If the control module 100 determines that the second voice data is not matched with all of the default voice data, the control module 100 may control the display module 104 to display a view of the voice control incorrectness message stored in the memory module 106 in advance. Then, the control module 100 performs step S108 again.

Step S112: the control module 100 loads a command corresponding to the default voice data matched with the second voice data, and performs the loaded control command directly.

Step S114: the control module 100 determines whether the display apparatus 10 is switched to the status of disabling voice control.

If the control module 100 determines that the display apparatus 10 is switched to the status of disabling voice control, the control module 100 performs the step S116. Otherwise, the control module 100 performs the step S104 again for receiving the voice again under the status of enabling voice control and executing the control command corresponding to the received voice.

Step S116: the control module 100 control the display module 104 to stop displaying the view of the voice control instruction message for instructing the user that the voice control operation is unavailable currently. Namely, the view of the voice control instruction message is used for instructing that the display apparatus 10 is under the status of disabling voice control currently.

One of the exemplary embodiments, the control module 100 may further control the display module 104 to display a view of voice-control-disabling message stored in the memory module 106 in advance, so as to clearly instruct the user that the voice control is unavailable currently.

The present disclosed example can clearly lead the user to understand the timing of the voice control being available via instructing the user the voice control timing, so as to enhance the user experience.

Please be noted that there are mainly two types of the voice control in those related voice control devices. The first type of the voice control device may receive environmental voice continuously, determine whether the received environmental voice comprises any voice data continuously, and execute the corresponded voice control command when detecting the voice data.

The second type of the voice control device may start to receive environmental voice and detect whether the environmental voice comprises any control voice after receiving a voice control pre-operation from the user (such as a specific button is pressed). Although the additional operation is needed by above-mentioned second type of the voice control device, the performance of above-mentioned second type of the voice control device doesn't be obviously reduced in normal time even there are too many types of available control voices because the voice control function is implemented after the voice control pre-operation is was inputted.

Compare to the first type of the voice control device, the present disclosed example can effectively reduce the usage of operating resource in normal time because there are very few types of control voice needed to be detected via triggering the voice control process after detecting the control voice of the specific trigger text or sentence (namely, the first voice data inputted by the user is matched with the trigger voice data).

Compare to the second type of the voice control device, the present disclosed example can effectively omit the voice control pre-operation, and provide better convenience and user experience.

Figure 4:
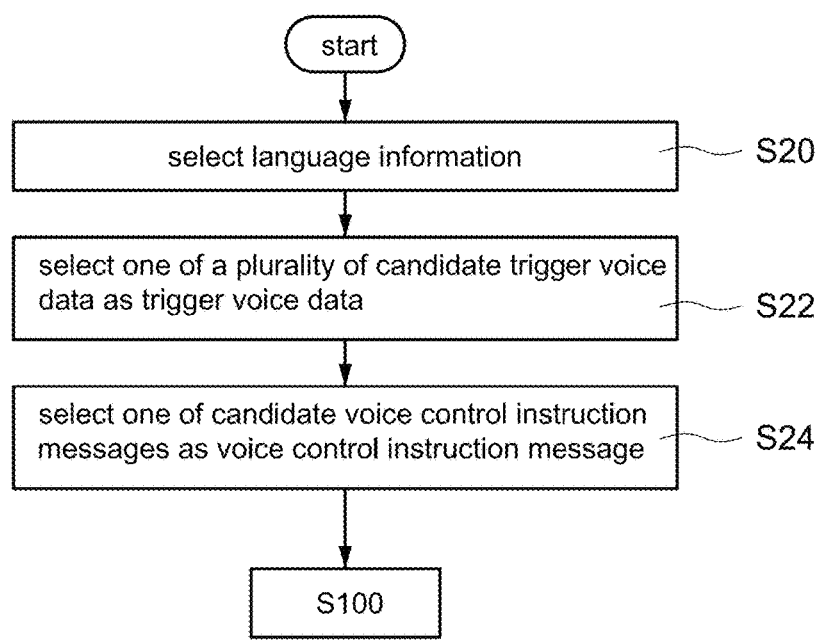
FIG. 4 is a partial flowchart of a method of instructing voice control timing according to the second embodiment of the present disclosed example.

Please refer to FIG. 3 and FIG. 4 simultaneously; FIG. 4 is a partial flowchart of a method of instructing voice control timing according to the second embodiment of the present disclosed example. In this embodiment, the memory module 106 further stores a plurality of language information, a plurality of candidate trigger voice data, and a plurality of candidate voice control instruction message. Each candidate trigger voice data and each candidate voice control instruction message respectively correspond to the different language information.

For example, if a plurality of above-mentioned language information comprise English, German and Chinese, a plurality of the candidate trigger voice data may be the candidate trigger voice data in English, the candidate trigger voice data in German, and the candidate trigger voice data in Chinese respectively, a plurality of the candidate voice control instruction messages may be the candidate voice control instruction message in English, the candidate voice control instruction message in German, and the candidate voice control instruction message in Chinese respectively.

Compare to the embodiment shown in FIG. 3, this embodiment comprises following steps before the step S100 for configuring the trigger voice data and the voice control instruction messages.

Step S20: the control module 100 selects one of a plurality of language information. More specifically, the control module 100 may first control the display module 104 to display a view of a plurality of the language information. Then, the user may operate the keypad module 108 or the other input interface, such as display module 104 being a touchscreen, to select one of the pluralities of the language information as the language used by the display apparatus 10.

One of the exemplary embodiments, the control module 100 may retrieve region information, such as the country or the district where the display apparatus 10 is located, from the remote server 14 via the network module 110 and the network 12 automatically, and may select the corresponded language information, such as the official language of the selected country or the district, from a plurality of language information according to the retrieved region information automatically.

Step S22: the control module 100 selects one of a plurality of candidate trigger voice data according to the selected language information, and configures the selected candidate trigger voice data as the trigger voice data. More specifically, the candidate trigger voice data selected by the control module 100 is represented in the selected language information.

Step S24: the control module 100 selects one of a plurality of the candidate voice control instruction messages according to the selected language information, and configures the selected candidate voice control instruction message as the voice control instruction message. More specifically, the candidate voice control instruction message selected by the control module 100 is represented in the selected language information.

The present disclosed example can be applied to the users speaking the different languages via selecting the trigger voice data and the voice control instruction message in the corresponded language, so as to provide better user experience.

Figure 5:
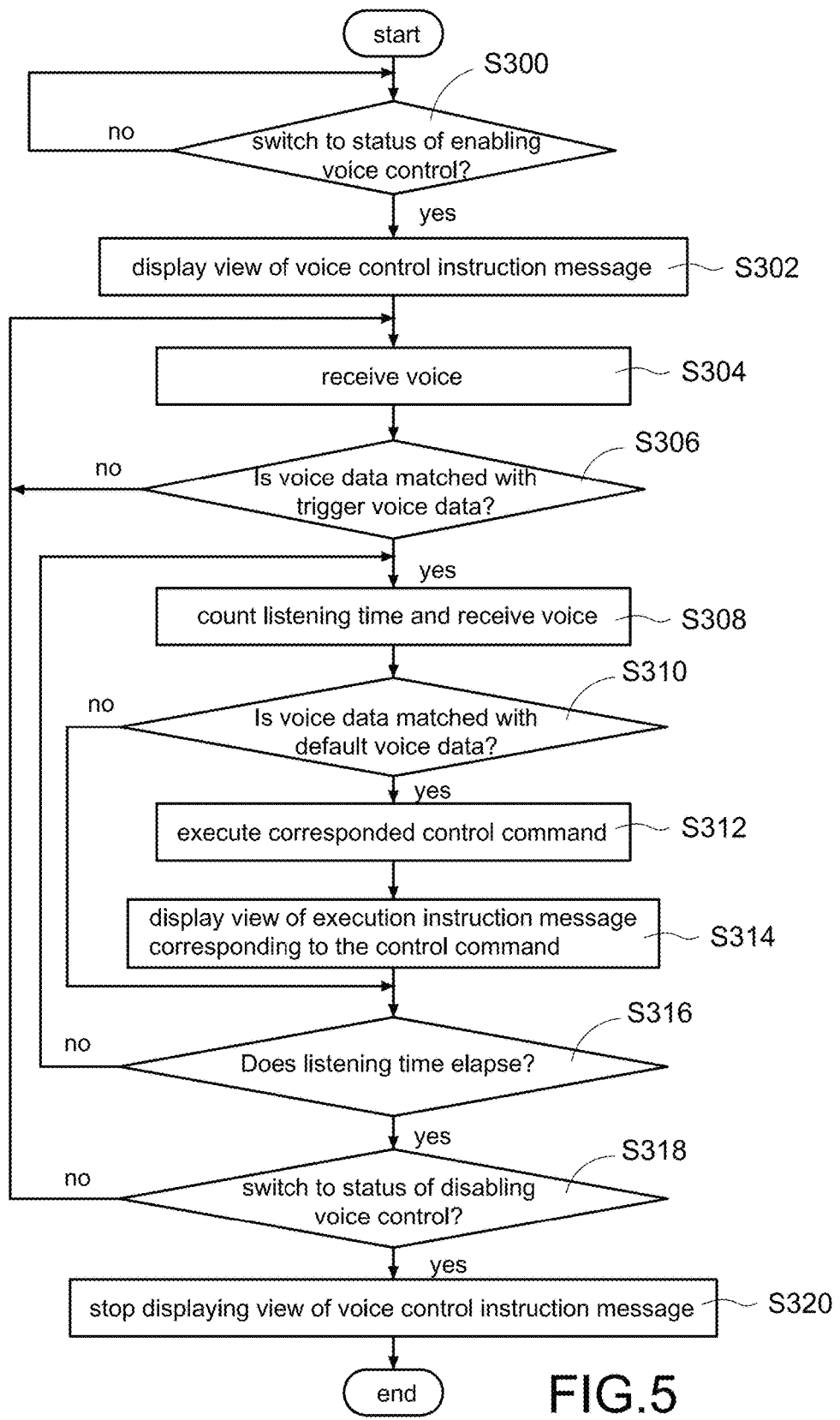
FIG. 5 is a flowchart of a method of instructing voice control timing according to the third embodiment of the present disclosed example.
Figure 7A:
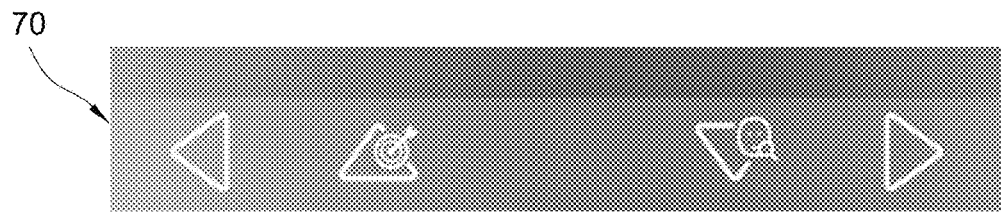
FIG. 7A is a first schematic view of instructing voice control timing according to the present disclosed example.
Figure 7B:
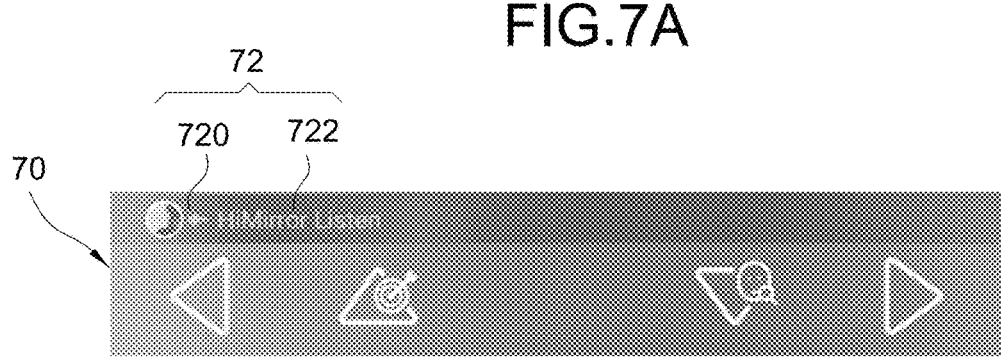
FIG. 7B is a second schematic view of instructing voice control timing according to the present disclosed example.
Figure 7C:
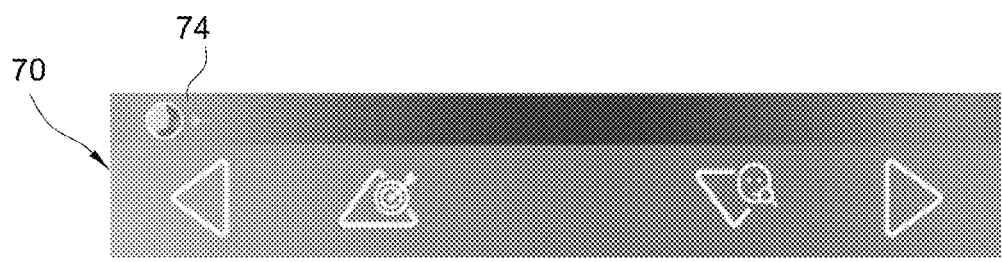
FIG. 7C is a third schematic view of instructing voice control timing according to the present disclosed example.
Figure 7D:
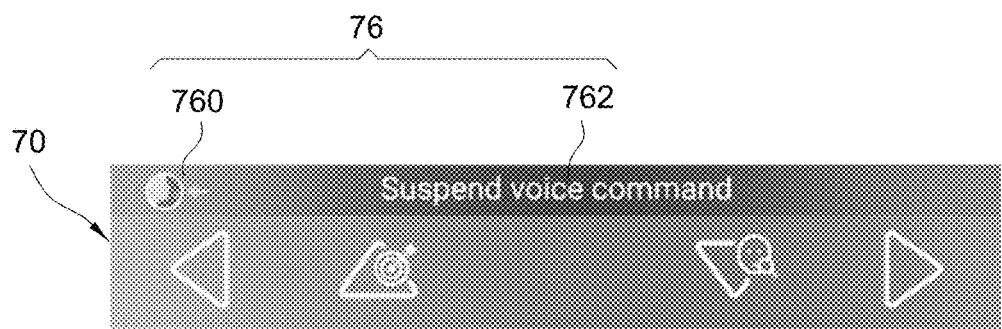
FIG. 7D is a fourth schematic view of instructing voice control timing according to the present disclosed example.

Please refer to FIG. 5 and FIG. 7A to FIG. 7D simultaneously, FIG. 5 is a flowchart of a method of instructing voice control timing according to the third embodiment of the present disclosed example, FIG. 7A is a first schematic view of instructing voice control timing according to the present disclosed example, FIG. 7B is a second schematic view of instructing voice control timing according to the present disclosed example, FIG. 7C is a third schematic view of instructing voice control timing according to the present disclosed example; and FIG. 7C is a third schematic view of instructing voice control timing according to the present disclosed example, and FIG. 7D is a fourth schematic view of instructing voice control timing according to the present disclosed example.

Compare to the embodiment shown in FIG. 3, the method of instructing voice control timing of the embodiment shown in FIG. 5 may further implement continuous voice control function having ability of making the user operate voice control many times during the specific time interval (namely, the listening time described below) being after triggering the voice control process. The method of instructing voice control timing of this embodiment comprises following steps.

Step S300: the control module 100 determines whether the display apparatus 10 is switched to the status of enabling voice control module One of the exemplary embodiments, when the display apparatus 10 is not under the status of enabling voice control, such as being under the status of disabling voice control, the display apparatus 10 may not display the view of the voice control instruction message, such as the display screen 70 shown in FIG. 7A.

If the control module 100 determines that the display apparatus 10 is switched to the status of enabling voice control, the control module 100 performs the step S302. Otherwise, the control module 100 performs the step S300 again for continuously determining whether the display apparatus 10 is switched to the status of enabling voice control.

Step S302: the control module 100 controls the display module 104 to display the view of the voice control instruction message, such as the view 72 of the voice control instruction message, for instructing the user that the voice control operation is currently available.

One of the exemplary embodiments, the voice control instruction message comprises a voice control graphic message and a trigger text message. The display apparatus 10 displays the view 720 of the voice control graphic message and the view 722 of the trigger text message. The voice control graphic message is used for instructing the user that the display apparatus 10 is currently under the status of enabling voice control. The trigger text message is used for instructing the user the content of the trigger voice data (namely, the voice which the user must to input if he/she wants to use the voice control, the trigger text message in this example shown in FIG. 7 comprises the term "HiMirror Listen").

Step S304: the control module 100 receives the first voice and generates the corresponded first voice data via the voice-inputting module 102.

Step S306: the control module 100 determines whether the first voice data is matched with the default trigger voice data.

If the control module 100 determines that the first voice data is matched with the trigger voice data, the control module 100 performs step S308. Otherwise, the control module 100 performs the step S304.

One of the exemplary embodiments, the control module 100 may stop displaying the view 722 of the text message as shown in FIG. 7C after determining that the first voice data is matched with the trigger voice data. Thus, the user may clearly know that the inputted first voice had passed the trigger voice verification.

Step S308: the control module 100 starts to count a default listening time (such as 8 seconds, 10 seconds or the other time interval), receive the voice (such as the second voice) inputted by the user via the voice-inputting module 102 during counting the listening time, and generates the corresponded second voice data.

One of the exemplary embodiments, the control module 100 further comprises a count module 112. The control module 100 counts the listening time via the count module 112.

One of the exemplary embodiments, the control module 100 may control the display module 104 to display a set of view of a voice-receiving animation message (such as the view 74 of a voice-receiving animation message as shown in FIG. 7C) for instructing the user that the display apparatus 10 is receiving the second voice which the user is inputting before the listening time elapses.

Step S310: the control module 100 determines whether the second voice data is matched with the default voice data.

If the control module 100 determines that the second voice data is matched with anyone of a plurality of default voice data, the control module 100 performs the step S312. Otherwise, the control module 100 performs step S316.

Step S312: the control module 100 performs the control command corresponding to the matched default voice data.

Step S314: the control module 100 controls the display module 104 to display the view of the execution instruction message corresponding to the executed control command, such as the view 76 of the execution instruction message shown in FIG. 7D.

One of the exemplary embodiments, the execution instruction message comprises a voice control graphic message and an execution text message. The display apparatus 10 displays a view 760 of the voice control graphic message and a view 762 of the execution text message. The voice control graphic message is used for instructing the user that the display apparatus 10 is currently under the status of enabling voice control. The execution text message is used for instructing the user that the current execution phase of the control command, taking the text "Suspend voice command" for example in FIG. 7D.

Step S316: the control module 100 determines whether the listening time elapsed via the count module 112.

If the control module 100 determines that the listening time elapsed, the control module 100 performs step S318. Otherwise, the control module 100 performs the steps S308-S314 again for receiving another voice which the user further inputs (such as the third voice), generating another corresponded voice data (such as the third voice data), and executing the corresponded control command if the third voice data is matched with any default voice data.

Thus, the present disclosed example can execute the voice control operations continuously without executing the second times or more the verification of the trigger voice after the use passed the verification of the trigger voice, so as to effectively enhance convenience and user experience.

Step S318: the control module 100 determines whether the display apparatus 10 is switched to the display apparatus.

If the control module determines that the display apparatus 10 is switched to the status of disabling voice control, the control module 100 performs step S320. Otherwise, the control module 100 performs the step S304 again.

Step S320: the control module 100 control the display module 104 to stop displaying the view of the voice control instruction message for instructing the user that the voice control is unavailable currently, such as controlling the display module 104 to recover to display the display screen 70 shown in FIG. 7A.

Please be noted that although the continuous voice control function is configured to make the display apparatus 10 has ability of receiving the voice control operation during counting the listening time after the user triggers the trigger voice process, but this specific example is not intended to limit the scope of the present disclosed example.

In another embodiment, the continuous voice control function is configured to make the display apparatus 10 have ability of receiving the voice control operation for specific times continuously (such as three times) after the user triggers the trigger voice process. Namely, the listening time is replaced with the listening number, the count module 112 is modified to count number of voice control, and counts the number when receiving the user's voice.

Figure 6:
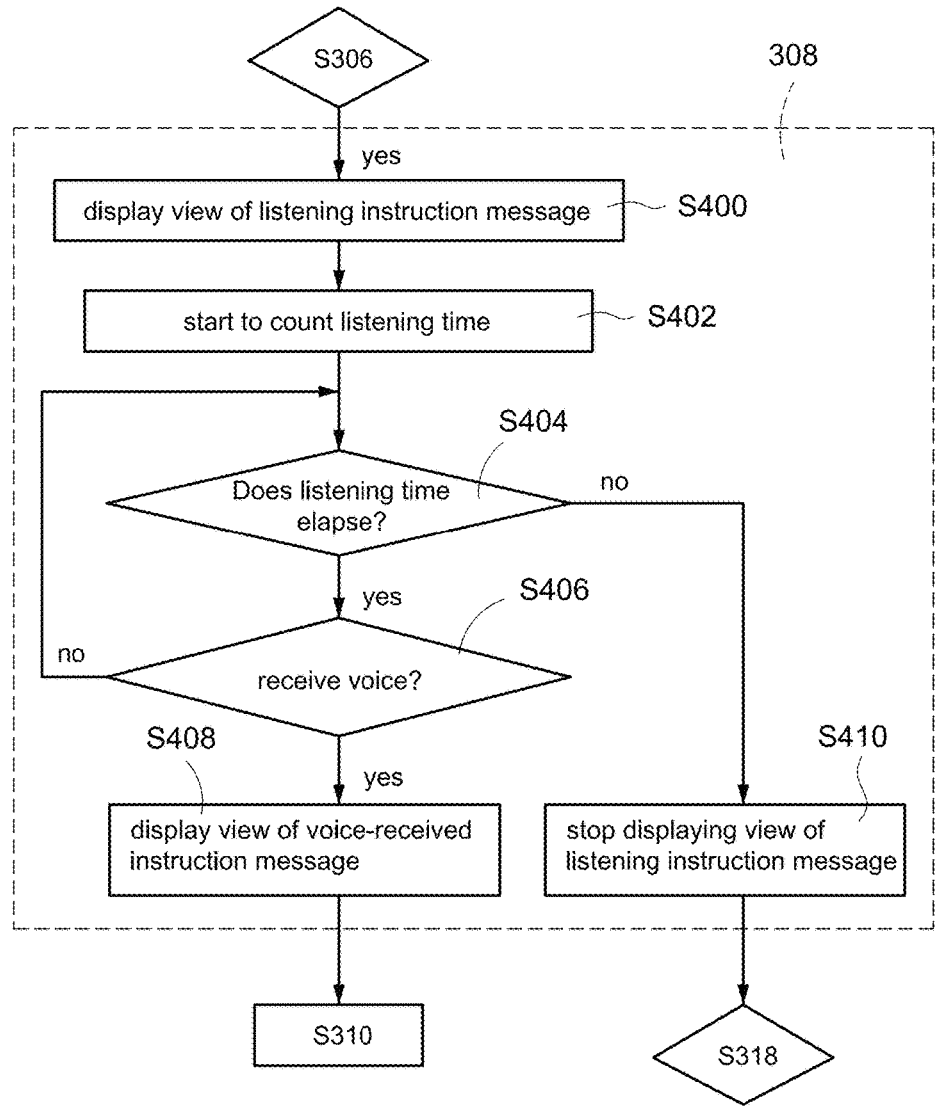
FIG. 6 is a partial flowchart of a method of instructing voice control timing according to the fourth embodiment of the present disclosed example.

Please refer to FIG. 5 and FIG. 5 simultaneously; FIG. 6 is a partial flowchart of a method of instructing voice control timing according to the fourth embodiment of the present disclosed example. Compare to the embodiment shown in FIG. 5, the step S308 of the method of instructing voice control timing comprises following steps.

Step S400: the control module 100 controls the display module 104 to display the view of the listening instruction message for instructing the user that the display apparatus 10 is available to continuously receive voice control operation.

Step S402: the control module 100 starts to count the listening time via count module 112.

Step S404: the control module 100 determines whether the listening time elapsed.

If the control module 100 determines that the listening time had elapsed, the control module 100 performs step S410. Otherwise, the control module 100 performs step S406.

Step S406: the control module 100 determines whether a voice (such as the second voice or the third voice) inputted by the user is received via the voice-inputting module 102 before the listening time elapses.

If the control module 100 determines that the voice inputted by the user is received, the control module 100 generates the corresponded voice data (such as the second voice data or the third voice data), and performs step S408. Otherwise, the control module 100 performs the step S404 again for continuing to count the listen time.

Step S408: the control module 100 controls the display module 104 to display the view of the voice-received instruction message for instructing the user that the display apparatus 10 had received the voice inputted by the user.

If the control module 100 determines that the listening time had elapsed, the control module 100 perform step S410: the control module 100 controls the display module 104 to stop displaying the view of the listening instruction message.

The present disclosed example can effectively enhance user experience via displaying the different messages respectively in the different process phase.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of instructing voice control timing applied to a display apparatus having ability of voice control, comprising following steps of:
   a) controlling the display apparatus having ability of voice control to display a view of a trigger text message when switching to a status of enabling voice control, wherein the trigger text message is used for instructing content of trigger voice data;
   b) receiving first voice by a voice-inputting module after the trigger text message displayed by the display module is watched and the trigger text message is accordingly read out by a user to complete the input of the first voice for generating first voice data during displaying the view of the trigger text message;
   c) receiving second voice for generating second voice data if determining that the first voice data is matched with the trigger voice data;
   d) executing a control command corresponding to default voice data if determining that the second voice data is matched with the default voice data; and
   e) stopping displaying the view of the trigger text message and refusing voice control when the display apparatus having ability of voice control switches to a status of disabling voice control.

2. The method of instructing voice control timing according to claim 1, wherein the method of instructing voice control timing comprises following steps before step a):
   f1) selecting one of a plurality of language information;
   f2) selecting one of a plurality of candidate trigger voice data according to the selected language information, and configuring the selected candidate trigger voice data as the trigger voice data; and
   f3) selecting one of a plurality of candidate voice control instruction messages according to the selected language information, and configuring the selected candidate voice control instruction message as the trigger text message.

3. The method of instructing voice control timing according to claim 1, wherein the step c) comprises:
   c1) displaying a view of a listening instruction message if determining that the first voice data is matched with the trigger voice data; and
   c2) receiving the second voice data for generating the second voice data.

4. The method of instructing voice control timing according to claim 3, wherein the step c) further comprises:
   c3) starting to count a listening time after displaying the view of the listening instruction message; and
   c4) stopping displaying the view of the listening instruction message after the listening time elapsed.

5. The method of instructing voice control timing according to claim 4, wherein the step c) further comprises a step c5) displaying a view of a voice-received instruction message after the second voice data was received.

6. The method of instructing voice control timing according to claim 4, wherein the method of instructing voice control timing further comprises following steps after the step d):
   g1) receiving third voice for generating third voice data during counting the listening time; and
   g2) executing the control command corresponding to the matched default voice data if the third voice data is matched with one of the plurality of the default voice data.

7. The method of instructing voice control timing according to claim 1, wherein the step d) comprises following steps of:
   d1) executing the control command corresponding to the matched default voice data if determining that the second voice data is matched with one of the plurality of the default voice data; and
   d2) display a view of an execution instruction message corresponding to the control command.

8. A display apparatus having ability of voice control, comprising:
   a voice-inputting module;
   a display module;
   a memory module for storing trigger voice data, a plurality of default voice data and a plurality of control commands respectively corresponding to the plurality of the default voice data; and
   a control module electrically connected to the voice-inputting module, the display module and the memory module;
   wherein the control module controls the display module to:
   display a view of a trigger text message when the display apparatus having ability of voice control switches to a status of enabling voice control, the trigger text message is used for instructing content of the trigger voice data; and
   stop displaying the view of the trigger text message when the display apparatus having ability of voice control switches to a status of disabling voice control;
   wherein the voice-inputting module is configured to allow a user to:
   input a first voice after watching the trigger text message displayed by the display module and accordingly reading the trigger text message out to complete the input of the first voice for generating a first voice data during the display module displaying the view of the trigger text message;
   input second voice for generating second voice data if the control module determines that the first voice data is matched with the trigger voice data and making the control module execute the corresponded control command if determining that the second voice data is matched with one of the plurality of the default voice data; and
   be unable to execute voice control by the voice-inputting module during stopping displaying the view of the trigger text message.

9. The display apparatus having ability of voice control according to claim 8, wherein the memory module further stores a plurality of candidate trigger voice data and a plurality of candidate voice control instruction messages; the display apparatus having ability of voice control further comprises a keypad module electrically connected to the control module, the keypad module receives a language-selecting operation for selecting one of a plurality of the language information, the control module selects one of the plurality of the candidate trigger voice data according to the selected language information, makes the selected candidate trigger voice data as the trigger voice data, selects one of the plurality of the candidate voice control instruction messages according to the selected language information, and makes the selected candidate voice control instruction message as the trigger text message.

10. The display apparatus having ability of voice control according to claim 8, wherein the display module displays a view of a listening instruction message if the first voice data is matched with the trigger voice data.

11. The display apparatus having ability of voice control according to claim 1, wherein the control module comprises a control module, the count module starts to count a listening time after the display module displayed the view of the listening instruction message, and the display module stops displaying the view of the listening instruction message after the listening time elapsed.

12. The display apparatus having ability of voice control according to claim 10, wherein the display module displays a view of a voice-received instruction message after the voice-inputting module received the second voice data.

13. The display apparatus having ability of voice control according to claim 10, wherein the voice-inputting module receives third voice data for generating third voice data during counting the listening, and the control module executes the corresponded control command if determining that the third voice data is matched with one of the plurality of the default voice data.

14. The display apparatus having ability of voice control according to claim 8, wherein the display module displays a view of an execution instruction message corresponding to the control command executed by the control module.

* * * * *